United States Patent
Chen

(10) Patent No.: US 7,291,995 B2
(45) Date of Patent: Nov. 6, 2007

(54) AIR FAN ROTATION SPEED CONTROL METHOD AND STRUCTURE THEREOF

(75) Inventor: Tsung-Chun Chen, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 76 days.

(21) Appl. No.: 11/360,689

(22) Filed: Feb. 24, 2006

(65) Prior Publication Data

US 2007/0200517 A1   Aug. 30, 2007

(51) Int. Cl.
   *H02P 1/00* (2006.01)
(52) U.S. Cl. ............... 318/268; 318/634; 318/779; 318/783; 318/461; 318/471; 388/934
(58) Field of Classification Search ........... 318/268, 318/634, 779, 783, 461, 471; 62/196.4, 505; 388/934
See application file for complete search history.

(56) References Cited

U.S. PATENT DOCUMENTS 6,363,732 B1 *   4/2002   Bluhm ............... 62/196.4

* cited by examiner

*Primary Examiner*—Karen Masih
(74) *Attorney, Agent, or Firm*—Birch, Stewart, Kolasch & Birch, LLP

(57) ABSTRACT

An air fan rotation speed control method and a structure thereof aim to provide an automatic control mode and a manual control mode at the same time to control rotation speed regulation of an air fan to achieve instant heat dissipation for an environment and reduce temperature rising of the environment efficiently. The present invention has a rotation speed determination mechanism that adopts the higher rotation speed request at a higher priority to regulate the rotation speed of the air fan in either control mode. Hence the temperature of the environment can be reduced at the higher rotation speed.

10 Claims, 2 Drawing Sheets

AIR FAN ROTATION SPEED CONTROL METHOD AND STRUCTURE THEREOF

FIELD OF THE INVENTION

The present invention relates to an air fan rotation speed control method and a structure thereof, and more particularly to a method and structure that have an automatic control mode and a manual control mode at the same time to regulate and control air fan rotation speed to dissipate heat instantly and reduce temperature rising in an environment.

BACKGROUND OF THE INVENTION

With the functional demands of the computer system grow constantly, especially in the environment where the technologies of the Internet and multimedia advance rapidly, the performance of electronic devices increase. The heat energy generated in the electronic device also increases significantly. As the computer system usually has a closed interior space, and the size and installation space are constrained, as a result, the computer system often encounters machine crash due to overheating.

At present, the computer system (or power supply of the computer system) generally uses an air fan to channel external cooling airflow into the computer system or dispel the interior heated airflow outside to dissipate heat and reduce temperature. In response to different temperature rising conditions in various operating conditions of the computer system, regulating the rotation speed of the air fan usually adopts a manual control mode or an automatic control mode. The automatic control mode generally includes a timing mode, a temperature detection mode or a power use mode that are based on parameters attributable to increasing of the temperature in the computer system to regulate the air fan rotation speed. The automatic control mode controls the air fan to rotate at different speeds under different parameters. The manual control mode inputs air fan rotation speed regulation commands through an external control button, or a communication means such as I2C, RS232, RS384 and the like. In an industrial computer array system, a remote control method is usually adopted to monitor the operation of the computer system. If a temperature rising condition of the computer system can be predicted, the control method can directly set and regulate the air fan at a desired rotation speed in advance. Then the air fan can reach or maintain the desired rotation speed earlier to keep the computer system operating in a stable temperature condition.

The two modes mentioned above are used independently in the present applications. Each has its advantages and drawbacks. However, as the present computer system becomes more powerful, integrating the two modes becomes necessary. For instance, while the manual control mode can set in advance the air fan rotation speed, it frequently happens that the communication network is interrupted or damaged, but the air fan still rotates at the preset speed. In the event that the temperature rises and exceeds the heat dissipation capability of the air fan, the computer system could be down and the air fan becomes dysfunctional.

SUMMARY OF THE INVENTION

Therefore the primary object of the present invention is to solve the aforesaid disadvantages. The present invention provides an automatic control mode and a manual control mode at the same time to regulate and control the rotation speed of an air fan to dissipate heat instantly and reduce temperature rising in an environment. The invention has a rotation speed determination mechanism to set a higher priority to regulate the air fan rotating at a higher speed in either control mode, so that better heat dissipation can be achieved in the environment at the higher rotation speed to reduce the temperature.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
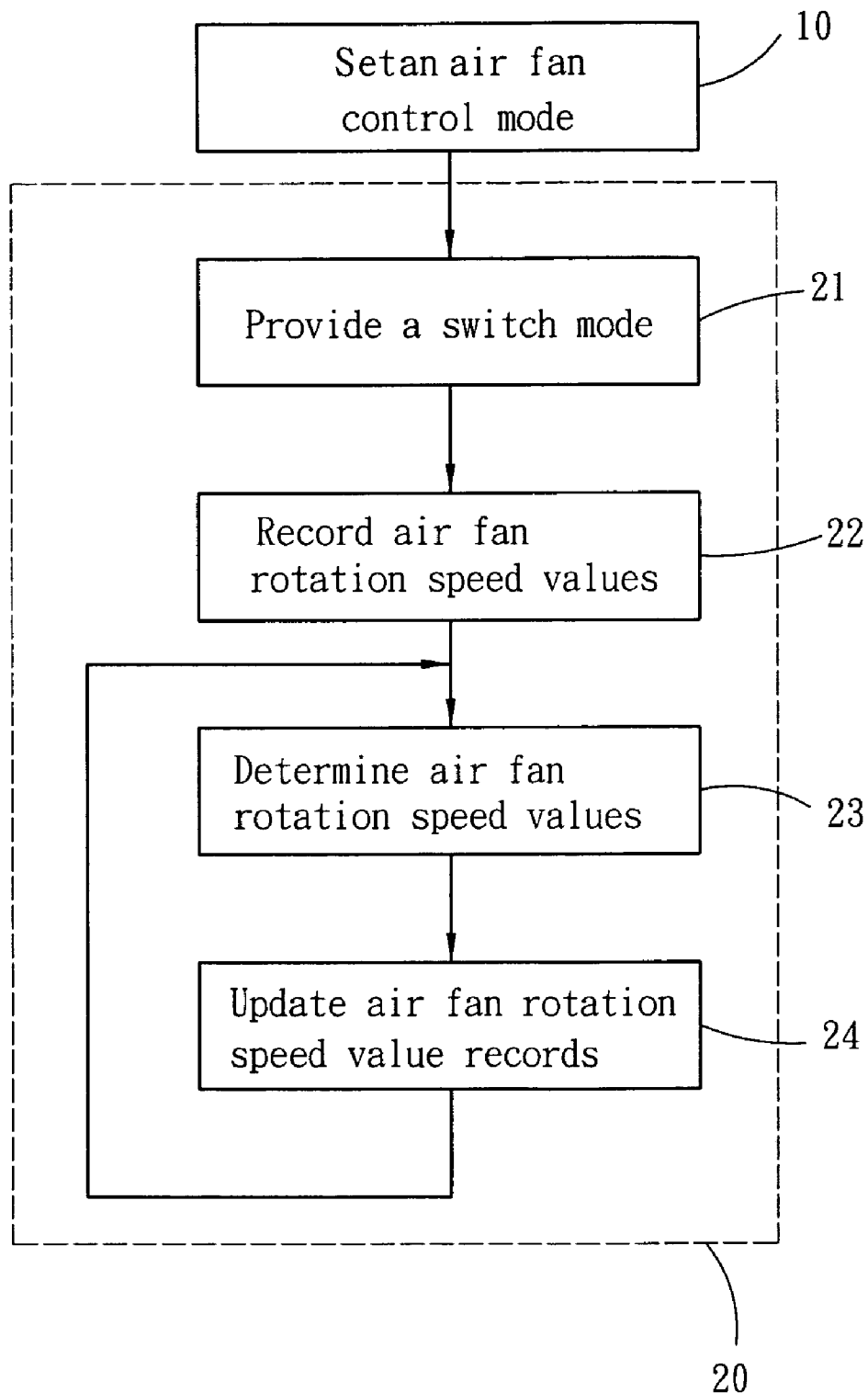
FIG. 1 is a flow chart of the control method of the present invention.

Please refer to FIG. 1 for the flow chart of the control method of the present invention. The method and structure of the present invention is adopted for use on an air fan in a computer system or a power supply to channel airflow to dissipate heat and reduce temperature. The control method includes:

setting an air fan control mode 10: the present invention includes an air fan rotation speed control system which has an automatic control mode to detect heat dissipating conditions of an environment and output a speed regulation signal to regulate air fan rotation speed, and a manual control mode to execute an air fan rotation speed regulation command to regulate the air fan rotation speed. The automatic control mode may be a timing mode, a temperature detection mode, a power use mode that affects temperature rising condition of the environment, or a combination of the aforesaid modes to control air fan rotation speed. The automatic control mode is implemented through an external control button, or a communication means such as I2C, RS232, RS384 to input the air fan rotation speed regulation command; and selecting an air fan control mode 20: the present invention provides a determination mechanism. Under the manual control mode in a condition not executing the air fan rotation speed regulation command, the rotation speed control system controls the air fan rotation speed through the automatic control mode; under the manual control mode in a condition of executing the air fan rotation speed regulation command, if the regulated rotation speed through the regulation command is higher than the regulated rotation speed under the automatic control mode, the manual control mode is enforced to be executed. If the regulated rotation speed through the regulation command is lower than the regulated rotation speed under the automatic control mode, the regulated rotation speed under the automatic control mode is maintained.

Refer to the embodiment shown in FIG. 1, the selecting an air fan control mode 20 may further include:

providing a switch mode 21: in normal conditions, either the automatic control mode or manual control mode may be maintained. When a new air fan rotation speed value is generated, another control mode is switched. Of course, operators can preset the air fan to rotate at a selected rotation speed through the manual control mode;

recording the air fan rotation speed value 22: in either control mode, the present invention provides a memory mechanism to record the air fan rotation speed value under the control mode of the preceding step. The recorded air fan rotation speed value becomes the air fan rotation speed base value of the succeeding steps;

determining air fan rotation speed value 23: when the switch mode is changed to another control mode, or temperature rising condition changes due to heat dissipation environment, the operators can input a new air fan rotation speed regulation command in the manual control mode, or the automatic control mode can detect changes of heat energy in the environment to output a speed regulation signal, namely when a new air fan rotation speed value is generated, the new air fan rotation speed value will be compared with the original recorded air fan rotation speed value;

updating the air fan rotation speed value record 24: after comparing the new air fan rotation speed value with the original recorded air fan rotation speed value, a higher air fan rotation speed value is retrieved to update the air fan rotation speed value record, and return to the preceding step. It is to be noted that if the step of providing a switch mode 21 is skipped, the air fan rotation speed can be regulated by a single control mode. Then the step of determining air fan rotation speed value 23 also may be omitted. Take the automatic control mode as an example, the air fan can monitor itself and alter the rotation speed according to temperature rising condition of the environment without comparing with the recorded air fan rotation speed value, so that the rotation speed can be reduced in response to environmental requirements. Namely, the present invention aims to be implemented in a condition in which the manual control mode and the automatic control mode can coexist. Only when the rotation speed value demanded by the automatic control mode is higher than the rotation speed value demanded by the manual control mode will the step of determining air fan rotation speed value 23 be executed. When there is no dual-mode coexisting signal, a single control mode operation is maintained.

Figure 2:
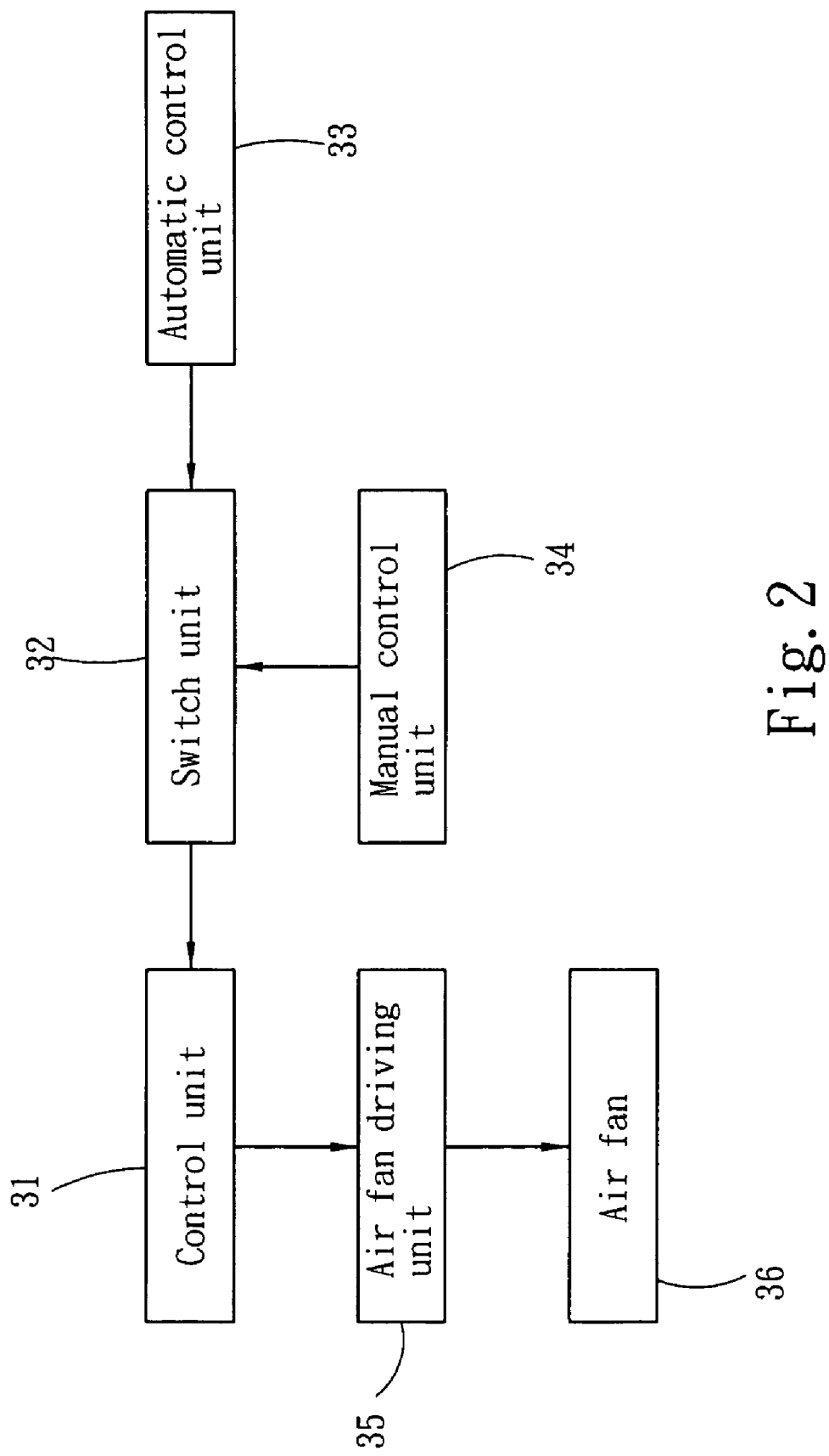
FIG. 2 is a schematic circuit block diagram of the control structure of the present invention.

Refer to FIG. 2 for a circuit block diagram of an embodiment of the present invention that illustrates a structure to control air fan rotation speed. The structure mainly includes an air fan driving unit 35 to receive a rotation speed signal to drive an air fan 36 to rotate. In this embodiment, an automatic control unit 33 and a manual control unit 34 are provided and coexist. The automatic control unit 33 detects the temperature rising condition of an environment and gets a speed regulation signal. The automatic control unit 33 may be a timer, a temperature detector, a power detector, or a combination thereof. The manual control unit 34 inputs an air fan rotation speed regulation command in response to the temperature rising condition of the environment. The manual control unit 34 controls through an external control button or a communication means such as I2C, RS232, RS384 or the like. In addition, the present invention further includes a control unit 31 which receives the speed regulation signal from the automatic control unit 33 or air fan rotation speed regulation command from the manual control unit 34. The control unit 31 further has a switch unit 32 which has a rotation speed comparing level in order to switch the signal inputted to the control unit 31 to the speed regulation signal or the air fan rotation speed regulation command. A higher air fan rotation speed value among the two becomes the rotation speed signal outputted by the control unit 31 to the air fan driving unit 35.

By means of the present invention, operators can regulate the air fan rotation speed faster in the manual control mode according to heat dissipation requirement of the environment, or reduce the air fan rotation speed in the manual control mode in response to the noise requirement of the environment. In the event that the manual control mode is suspended, under the determination mechanism of the present invention, if the automatic control mode detects that the temperature rises which could become harmful to computer system operation, a higher rotation speed regulation value is issued to replace the existing lower rotation speed under the manual control mode. Hence the computer system can function in a stable manner with the air fan operating in a desired heat dissipation condition.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An air fan rotation speed control method, comprising:
setting an air fan control mode; an air fan rotation speed control system having a built-in automatic control mode to detect heat dissipation conditions of an environment in order to output a speed regulation signal to regulate the rotation speed of an air fan, and a manual control mode to execute an air fan rotation speed regulation command to regulate the rotation speed of the air fan; and
selecting an air fan control mode; under the manual control mode in a condition of not executing the air fan rotation speed regulation command, the rotation speed control system controlling the air fan rotation speed through the automatic control mode; under the manual control mode in a condition of executing the air fan rotation speed regulation command, the manual control mode being enforced to be executed when the regulated rotation speed value under the air fan rotation speed regulation command is higher than the regulated rotation speed value under the automatic control mode; the regulated rotation speed value under the automatic control mode being maintained when the regulated rotation speed value under the air fan rotation speed regulation command is lower than the regulated rotation speed value under the automatic control mode.

2. The air fan rotation speed control method according to claim 1, wherein the selecting an air fan control mode includes:
providing a switch mode to change a control mode in normal conditions to another control mode when a new air fan rotation speed value is generated;
recording the air fan rotation speed value under each control mode;
determining the air fan rotation speed value by comparing the new air fan rotation speed value with the existing recorded air fan rotation speed value; and
updating an air fan rotation speed value record with a higher air fan rotation speed value and returning to the preceding step.

3. The air fan rotation speed control method according to claim 2, wherein the automatic control mode is selected from the group consisting of a timing mode, a temperature detection mode, and a power use mode that affect temperature rising condition of the environment, or a combination thereof to control the air fan rotation speed.

4. The air fan rotation speed control method according to claim 2, wherein the manual control mode inputs the air fan rotation speed regulation command through an external control button or a communication means.

5. The air fan rotation speed control method according to claim 1, wherein the automatic control mode is selected from the group consisting of a timing mode, a temperature detection mode, and a power use mode that affect temperature rising condition of the environment, or a combination thereof to control the air fan rotation speed.

6. The air fan rotation speed control method according to claim 1, wherein the manual control mode inputs the air fan rotation speed regulation command through an external control button or a communication means.

7. An air fan rotation speed control structure to regulate the rotation speed of at least one air fan to facilitate heat dissipation in an environment, comprising:
   an air fan driving unit to receive a rotation speed signal and drive the air fan to rotate;
   an automatic control unit to get a regulation speed signal through a detection means corresponding to a temperature rising condition of the environment;
   a manual control unit to input an air fan rotation speed regulation command corresponding to the temperature rising condition of the environment; and
   a control unit to receive the regulation speed signal and the air fan rotation speed regulation command, which has a rotation speed comparing level to compare with the regulation speed signal and the air fan rotation speed regulation command, and output the rotation speed signal of a higher air fan rotation speed regulation value to the air fan driving unit.

8. The air fan rotation speed control structure according to claim 7, wherein the automatic control unit is selected from the group consisting of a timer, a temperature detector, a power detector, or a combination thereof.

9. The air fan rotation speed control structure according to claim 7, wherein the control unit further has a switch unit which contains the rotation speed comparing level to switch the signal of the control unit to the regulation speed signal or the air fan rotation speed regulation command.

10. The air fan rotation speed control structure according to claim 7, wherein the manual control unit is an external control button or a remote communication end.

* * * * *